United States Patent [19]
Hudspeth et al.

[11] Patent Number: 5,950,852
[45] Date of Patent: Sep. 14, 1999

[54] JUNCTION BOX COVER

[75] Inventors: Lorelei M. Hudspeth, Memphis; James H. Whitehead, Collierville, both of Tenn.

[73] Assignee: Thomas & Betts International, Inc.

[21] Appl. No.: 09/124,743

[22] Filed: Jul. 29, 1998

[51] Int. Cl.[6] .................................................. H01F 27/00
[52] U.S. Cl. ............................................. 220/3.8; 174/66
[58] Field of Search ....................... 220/3.7, 3.8; 174/48, 174/49, 66, 67

[56] References Cited

U.S. PATENT DOCUMENTS

| | | |
|---|---|---|
| 2,847,140 | 8/1958 | Voss . |
| 2,929,529 | 3/1960 | Hudson .............................. 220/3.8 X |
| 2,931,533 | 4/1960 | Wiesmann ........................... 220/3.8 X |
| 2,936,092 | 5/1960 | Johnson .............................. 220/3.8 X |
| 3,081,896 | 3/1963 | Hoskins ............................... 220/3.8 X |
| 3,166,633 | 1/1965 | Guzan, Jr. et al. . |
| 3,199,713 | 8/1965 | Flachbarth . |
| 3,222,834 | 12/1965 | Taft ..................................... 220/3.8 X |
| 3,318,476 | 5/1967 | Clark .................................... 220/3.8 X |
| 3,565,276 | 2/1971 | O'Brien et al. ......................... 220/3.3 |
| 3,603,048 | 9/1971 | Hadfield .............................. 220/3.8 X |
| 4,054,222 | 10/1977 | Suk ........................................ 220/3.8 |
| 4,331,832 | 5/1982 | Curtis et al. ............................ 174/57 |
| 4,496,067 | 1/1985 | Benscoter .............................. 220/3.7 |
| 4,622,435 | 11/1986 | Trainor et al. ...................... 220/3.8 X |
| 4,916,258 | 4/1990 | Mohr ...................................... 174/48 |
| 5,422,434 | 6/1995 | Wuertz et al. ......................... 174/48 |

*Primary Examiner*—Steven Pollard
*Attorney, Agent, or Firm*—G. Andrew Barger

[57] ABSTRACT

A junction box cover for installing in an access port. The access port has an outer member with an inner surface and an upper surface, an inner member with an inside surface, a support surface, and a keyway. The junction box cover includes a ring and a junction box lid. The lid includes a first disc with a contact surface and a resting surface. The contact surface abuts the inner surface of the outer member and the resting surface is supported by the upper surface of the inner member when the cover is installed in the access port. The lid also includes a second disc that is integrally formed with the first disc and has an outer surface that abuts the inside surface of the inner annular member when the cover is installed in the access port. The lid further includes at least one extension integrally formed with the second disc and protruding therefrom for insertion through the keyway such that the cover non-threadably engages the access port. The cover allows for various thickness of flooring material and a positive insertion and securing into the access port.

21 Claims, 5 Drawing Sheets

5,950,852

JUNCTION BOX COVER

FIELD OF THE INVENTION

In general, the present invention relates to flooring covers. And, in particular, the present invention relates to a junction box cover for releasably installing in an access port of a junction box disposed under a floor.

BACKGROUND

Typical junction box covers, which are primarily used in the floors of casinos and financial institutions for allowing access to underfloor junction boxes, are undesirable for the following reasons. The covers are difficult to install because they require a number of screws to be inserted through the top of the cover and into the junction box.

Moreover, because the screws are accessible from the top of the cover, they can be undesirably loosened by individuals walking, or carts rolling, over the cover. It is also possible that unauthorized individuals could gain access to the junction box by loosening the screws. It is also common for installers to misplace or loose the screws, thereby allowing easy access to the junction box.

These covers are also not adjustable to accommodate various thicknesses of flooring material, such as carpet, rubber mat, linoleum, or tile. Typical covers also consist of a relatively thin "pizza pan" type design that includes a peripheral flange that abuts the surrounding flooring material. When a heavy apparatus, such as a cart of coins, is rolled over one of these covers, the flange is bent into the flooring material, damaging it and further making the cover more difficult to remove. Therefore, this non-sturdy design, which easily deforms, is also unacceptable.

SUMMARY OF THE INVENTION

The present invention eliminates the above difficulties and disadvantages by providing ajunction box cover for an access port that is disposed in ajunction box adapted to be received at least partially within a floor having a flooring material laid thereon. The junction box cover includes a ring that has a lower surface and a plurality of threaded bosses extending downward therefrom. The access port has an outer annular member with an inner surface and an upper surface, an inner annular member with an inside surface, a support surface, a retention surface, and at least one slot disposed within the inner annular member.

The cover further includes a substantially solid and annular junction box lid that has a first disc with a contact surface, a resting surface, and a plurality of bores extending therethrough. The contact surface abuts the inner surface of the outer annular member, while the resting surface is supported by the upper surface of the inner annular member when the cover is installed in the access port. Preferably, a plurality of recesses are disposed in the lid for receiving, at least partially, one of the threaded bosses therein. Each of the recesses are in axial alignment with the associated one of the plurality of bores. The lid further includes a second disc that is integrally formed with the first disc and has an outer surface that abuts the inside surface of the inner annular member when the cover is installed in the access port.

The lid further comprises at least one extension that is integrally formed with the second disc and protrudes therefrom for insertion through the at least one slot when the cover is installed in the access port. The slot, and a ramp formed on the inner member retention surface, form a keyway. The extension includes an engagement surface such that during installation when the extension is inserted through the slot and the cover is rotated clockwise, the engagement surface will contact the retention surface and the extension abuts a tang formed on the inner member such that the cover non-threadably engages the access port and becomes releasably secured therein. The tang, therefore, provides a positive locking feature such that minimal rotation of the cover is required for securing.

A ramp is disposed between the slot and tang for gradually tightening the cover into the access port during rotation.

The cover also includes a substantially annular section of the flooring material disposed between the ring and the junction box lid, which has a given thickness and is in contact with the lower surface of the ring. The section of the flooring material preferably has a plurality of notches cut therefrom, each receiving one of the threaded bosses therethrough. After the cover is assembled, the section of the flooring material is partially exposed through the junction box cover and is in a parallel plane with the flooring material covering the floor.

The cover further includes a plurality of securing means each having a set length and being inserted through one of the plurality of bores and corresponding recesses to screwingly engage one of the corresponding plurality of threaded bosses prior to the cover being installed in the access port to complete assembly of the cover. The plurality of securing means are unaccessible when the cover is installed in the access port.

Moreover, increasing and decreasing the set length of the plurality of securing means enables differing thicknesses of the section of flooring material to be used in the cover.

DETAILED DESCRIPTION OF THE PREFERRED EMBODIMENT(s)

Figure 4:
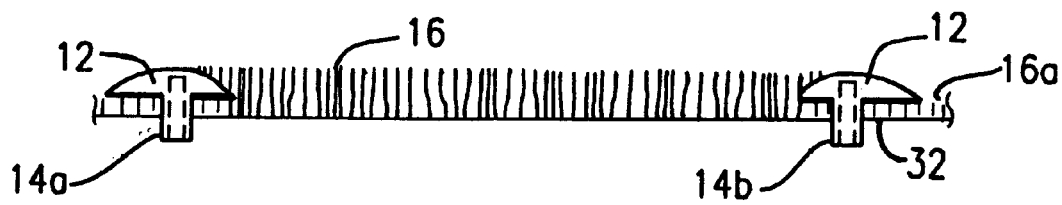
FIG. 4 is a cross sectional view of a ring and flooring material installed in the junction box cover of the present invention.

The above and other features, aspects, and advantages of the present invention will now be discussed in the following detailed description and appended claims while considered in conjunction with the accompanying drawings in which identical reference characters designate like elements throughout the views. Shown in FIG. 1 is a junction box cover 10 for an access port 42, as shown in FIGS. 2, 3, 6, and 7, which is disposed in a junction box 40 adapted to be received at least partially within a floor having a flooring material 16a laid thereon, as shown in FIGS. 4, 6, and 7.

Figure 1:
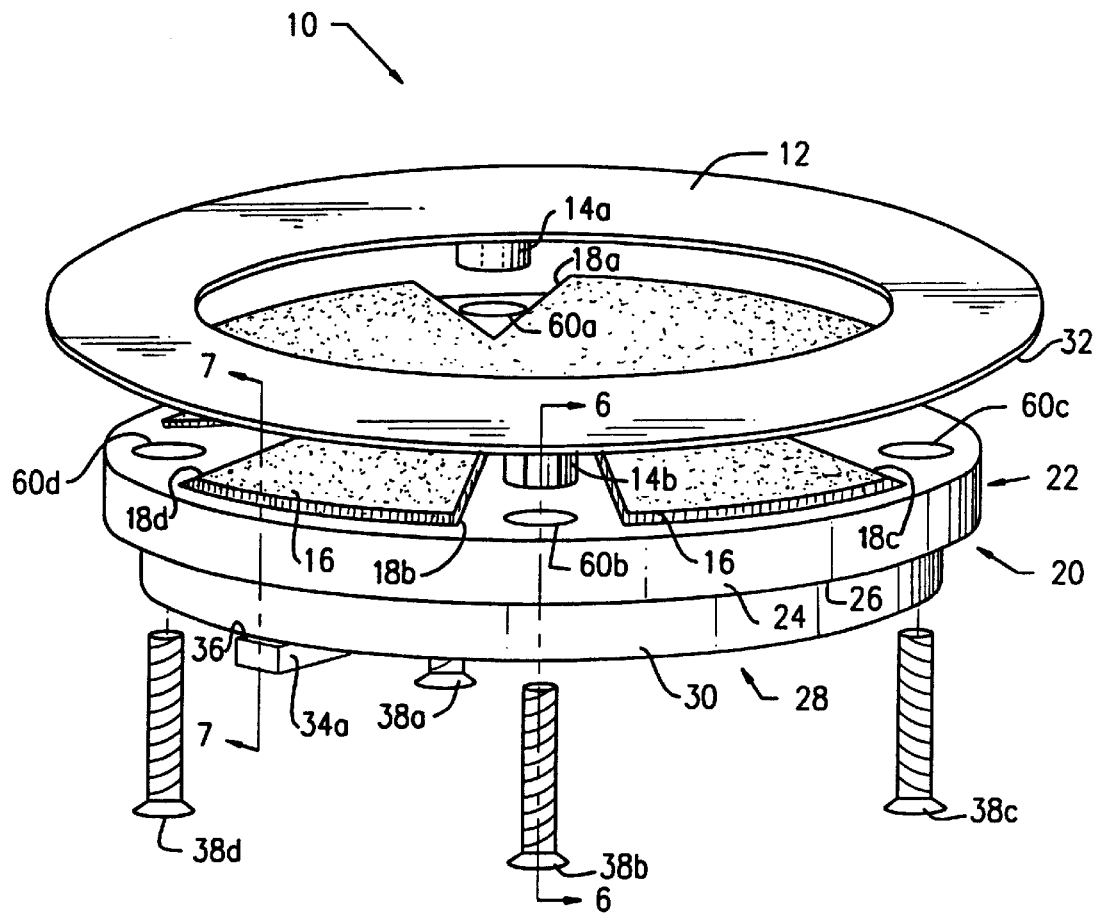
FIG. 1 is a perspective view of a junction box cover of the present invention.
Figure 6:
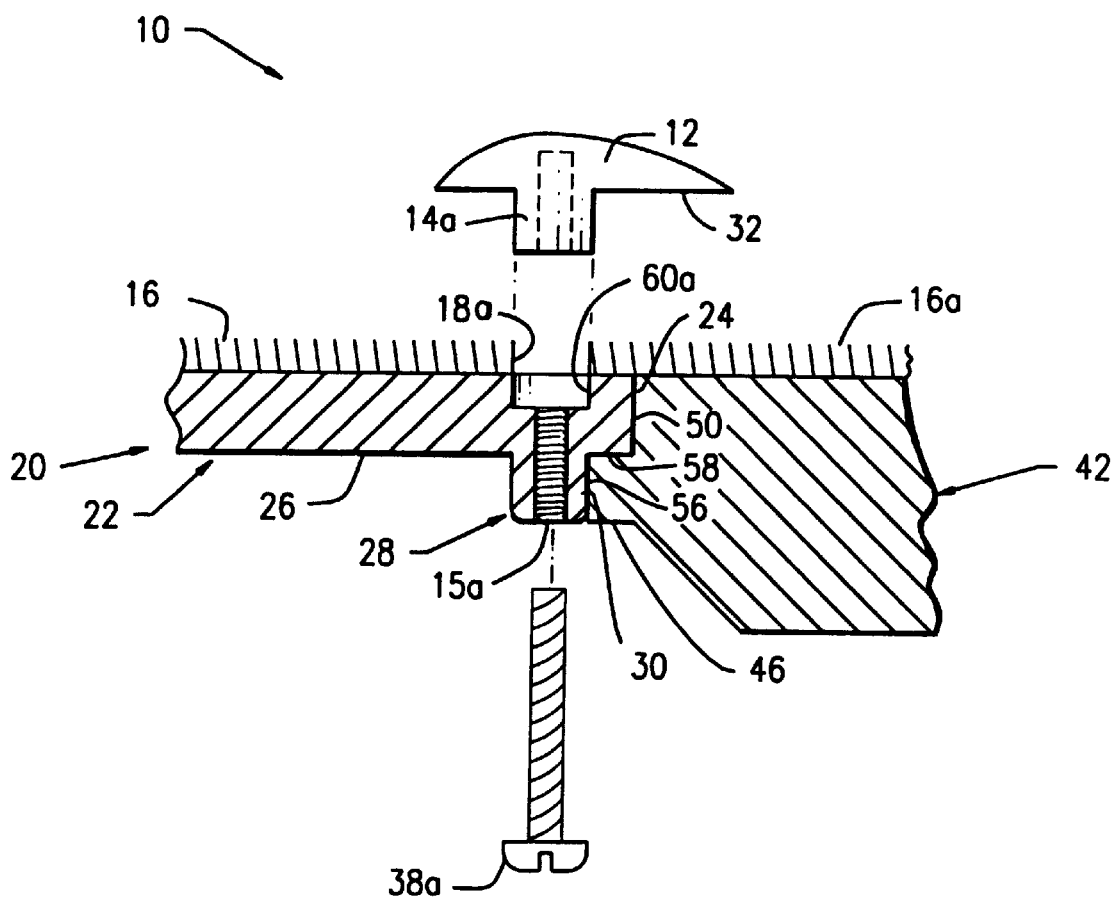
FIG. 6 is a cross sectional view of the cover installed in ajunction box taken along sight Line 6—6 of FIG. 1.
Figure 7:
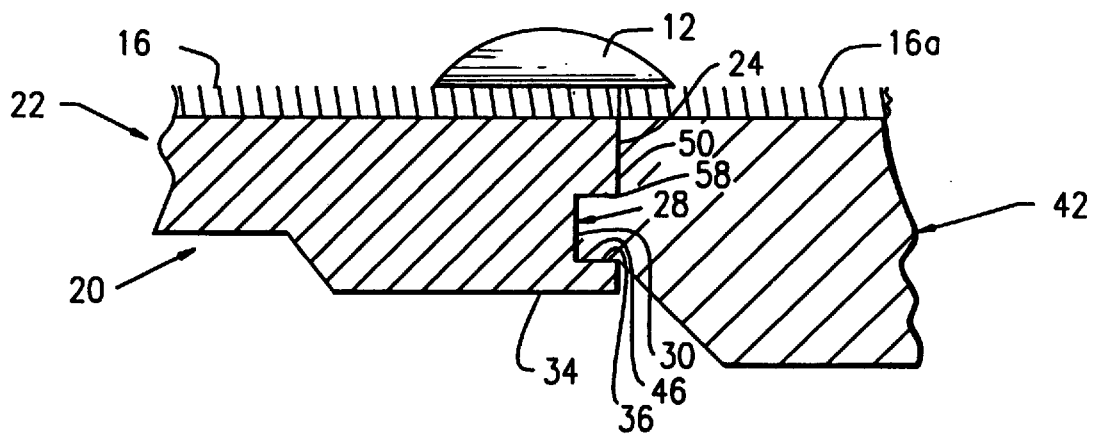
FIG. 7 is a cross sectional view of the cover installed in the junction box showing one of the extensions taken along sight Line 7—7 of FIG. 1.

The junction box cover 10 includes a ring 12 that has a lower surface 32 and a plurality of threaded bosses 14a, 14b, 14c, and 14d extending downward therefrom, as shown in FIGS. 1 and 6. The ring 12 is substantially solid and preferably constructed of brass or steel for increased strength and durability and to thereby withstand the forces of heavy carts or machinery being rolled over top of the ring 12. The threaded bosses 14a, 14b, 14c, and 14d of the ring 12 are for receiving screws 38a, 38b, 38c, and 38d or bolts therein during assembly of the cover 10, as shown in FIGS. 1 and 6, and as will be discussed in greater detail below.

The access port 42, as shown in FIGS. 2, 3, 6, and 7, which allows access to the contents of the junction box 40, forms, in combination with the cover 10, a junction box cover assembly. The access port 42 has an outer annular member 48 with an inner surface 50 and an upper surface 52. The access port 42 further includes an inner annular member 54 with an inside surface 56, a support surface 58 or mating surface, and a retention surface 46. At least one slot, but preferably two slots 44a and 44b are disposed in the inner annular member 54 and through which a portion of the cover 10 is inserted upon installation into the access port 42.

Figure 2:
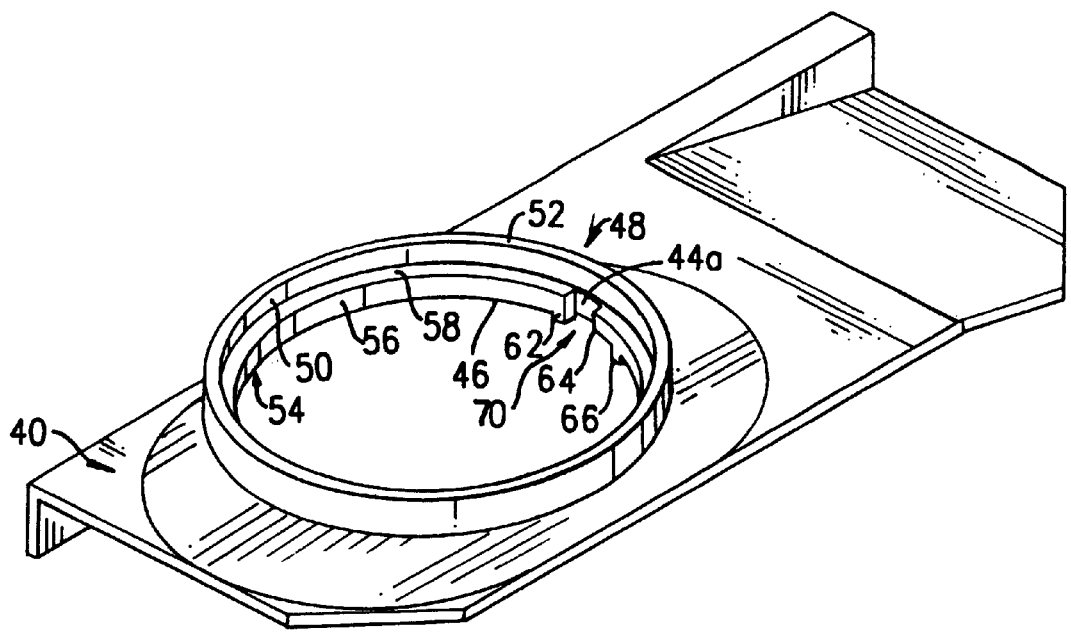
FIG. 2 is a perspective view of a junction box lid of the cover of the present invention.
Figure 3:
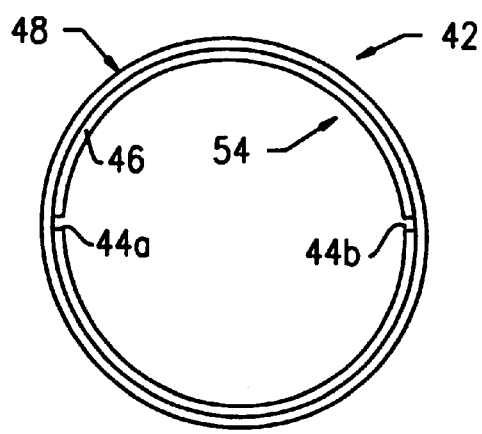
FIG. 3 is a plan view of a junction box.
Figure 8:
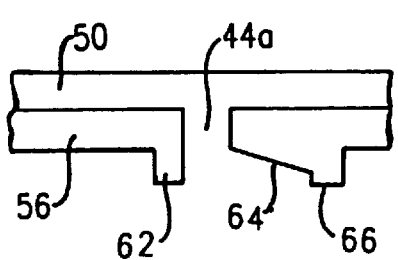
FIG. 8 is a side elevational view of a stop flange and a tang of the present invention.

As shown in FIGS. 2 and 8, the slots 44a and 44b partially form a keyway 70, which also includes a ramp 64 integrally formed on the inner annular member 54 and extending from the slot 44a and the retention surface 46 as will be discussed in greater detail below. The access port 42 and associated junction box 40, in which the port is disposed, are preferably constructed of an aluminum, cast metal material for increasing strength and durability, but other material, whether cast or not, and whether metal or not, are equally suitable if the particular application warrants such. For instance, a durable plastic could also be used or metal material such as iron or steel.

As shown in FIGS. 1, 5, 6, and 7, the cover 10 further includes an annular junction box lid 20, which is preferably substantially solid and also constructed of cast aluminum for increased strength and durability. The lid includes a first disc 22 with a contact surface 24, a resting surface 26, and a plurality of bores 15a, 15b, 15c, and 15d as shown in FIGS. 6 and 7, extending therethrough. During installation of the cover 10, the contact surface 24 abuts the inner surface 50, of the outer annular member 48 and simultaneously the resting surface 26 becomes supported by the support surface 58 of the inner annular member 54, as is shown in FIGS. 6 and 7. The resting surface 26 forms a first outer periphery.

Figure 5:
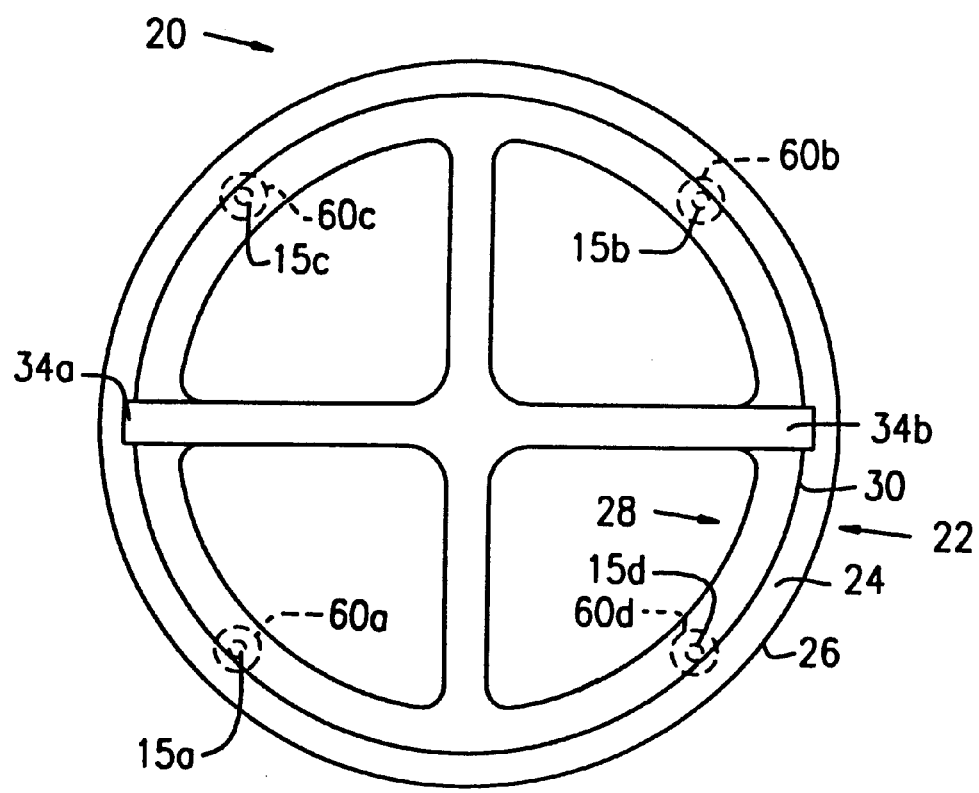
FIG. 5 is a plan view of the bottom of the junction box lid and two extensions formed therewith of the cover of the present invention.

A plurality of recesses 60a, 60b, 60c, and 60d are disposed in the first disc 22, as best shown in FIGS. 1, 5, and 6, for each receiving, at least partially, one of the threaded bosses 14a, 14b, 14c, and 14d therein. Each of the recesses 60a, 60b, 60c, and 60d are in axial alignment with one of the plurality of bores 15a, 15b, 15c, and 15d as shown in FIG. 6. The cover 10 also includes a plurality of securing means, which preferably include screws 38a, 38b, 38c, and 38d or bolts as discussed above and shown in FIGS. 1 and 6, but could also include any other threaded fasteners used in the industry.

Each of the screws 38a, 38b, 38c, and 38d have a set length and are inserted through one of the plurality of bores 15a, 15b, 15c, and 15d and corresponding recesses 60a, 60b, 60c, and 60d to screwingly engage one of the corresponding plurality of threaded bosses 14a, 14b, 14c, and 14d for assembly of the cover 10. This insertion is prior to the cover 10 being installed in the access port 42. The plurality of securing means are unaccessible when the cover 10 is installed in the access port 42, thereby preventing the screws 38a, 38b, 38c, and 38d from loosening as heavy carts of machinery are rolled over the cover 10 and preventing the screws 38a, 38b, 38c, 38d from being unwantingly removed by an individual.

The cover 10 further includes a second disc 28 that is integrally formed with the first disc 22 and which has an outer surface 30 that abuts the inside surface 56 of the inner annular member 54 when the cover 10 is installed in the access port 42, as shown in FIGS. 2 and 6. The outer surface 30 forms a second outer periphery that is preferably smaller in diameter than the first outer periphery of the first disc 22.

At least one extension, but preferably two extensions 34a and 34b, are integrally formed with the second disc 28 and protrude therefrom, as shown in FIGS. 1, 5, and 7. During installation of the cover 10 in the access port 42, the extensions 34a and 34b are inserted through slots 44a and 44b, respectively. A stop flange 62 extends downward from the inner member 54 and prevents the cover 10 from being rotated in the counterclockwise direction because one of the extensions 34a and 34b will abut the stop flange 62 upon insertion of the cover into the access port 42. The extensions 34a and 34b include an engagement surface 36 and as stated above, the ramp 64 extends downward from the slot 44a such that when the extensions 34a and 34b are inserted through the slots 44a, 44b, respectively, and the cover 10 is rotated clockwise, the engagement surface 36 will contact the retention surface 46 of the inner annular member 54 such that the cover 10 non-threadably engages the access port 42.

When the cover 10 is rotated, the ramp 64 gradually forces the cover 10 into the access port 42 and creates a tight fit between the two. The slot, or preferably slots 44a and 44b, as the case may be, the associated retention surface 46 of the access port 42, and the ramp 64 form the keyway 70 such that the cover 10 can be easily installed into the junction box 40 by being inserted and rotated in the keyway 70 only one way and similarly easily removed therefrom.

As best shown in FIG. 8, the inner annular member 54 further includes a tang 66 spaced from the slot 44a and formed therefrom, which prevents the cover 10 from being excessively rotated in the clockwise direction. In the embodiment shown, tang 66 is located to prevent cover 10 from being rotated more than a few degrees, preferably ten degrees or an amount of degrees spanning the width of the extensions 34a and 34b. Commonly, the covers are inserted into the access ports sight unseen. Therefore, the present invention provides the tang 66 so that by abutment of one of the extensions 34a and 34b against the tang 66, an installer, without visual inspection, becomes aware that the cover 10 is fully inserted into the access port 42.

Moreover, by having the tang 66 preferably placed at the ten rotational degrees from the slot 44a, minimal rotation is required for installing the cover 10 into the access port 42. The tang 66 prevents further clockwise rotation of the cover 10 once secured in the access port 42. It is understood, however, that the ramp 64, tang 66, and stop flange 62 can be switched such that the cover 10 is rotated counterclockwise to be installed in the access port 42.

Figure 9:
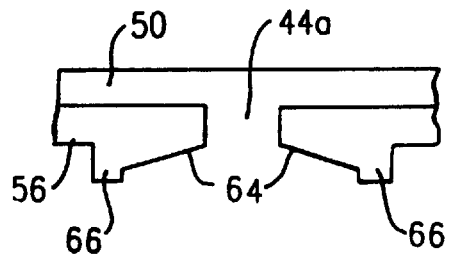
FIG. 9 is a side elevational view of two tangs of the present invention.

In an alternate embodiment, as shown in FIG. 9, opposing ramps 64 are formed on either side of slot 44a such that the cover 10 can be rotated in either clockwise or counterclockwise direction for installation. Tangs 66 are provided as stops on either side of the slot 44a. Preferably, the ramps 64 and tangs 66 are only disposed on either side of one of the slots, but not both, although such could also be employed for an increased strength application.

A section 16 of the flooring material 16a, which is preferably substantially annular and the circumference of which equals the first disc 22 of the lid, as shown in FIGS. 1, 4, 6, and 7, is disposed between the ring 12 and the lid 20 or against the upper surface of lid 20. It is understood that the flooring material 16a, and section 16 thereof, can be any flooring material commonly used in the industry such as carpet, rubber, tile, linoleum, concrete, or wood, which has a given thickness. Once the cover 10 is assembled, the section 16 of flooring material 16a is in contact with the lower surface 32 of the ring 12, and is pressed or adhesively held against the first disc 22 of the lid 20. The section 16 of the flooring material 16a has a plurality of notches 18a, 18b, 18c, and 18d cut therefrom, each receiving one of the threaded bosses 14a, 14b, 14c, and 14d therethrough as shown in FIG. 1. When the cover 10 is assembled, the section 16 of the flooring material 16a is partially exposed through the ring 12 for aesthetic purposes, as shown in FIG. 4.

The present invention further provides means for allowing for various thicknesses of the section 16 of flooring material 16a to be used in the cover 10. In particular, by increasing and decreasing the set length of the plurality of securing means, or screws 38a, 38b, 38c, and 38d this enables differing thicknesses of the section 16 of flooring material 16a to be used in the cover 10, depending on the flooring material 16a used in a particular application. For example, in a casino the flooring material 16a may be relatively thick carpet, but in a bank it may be relatively thin linoleum. The present invention is thus adaptable to receive various thicknesses for the section 16 of flooring material 16a.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Further, although the above cover has been discussed in relation to floors, such a cover is equally suitable for covering junction boxes that may be placed in walls, ceilings, or other areas. Therefore, the above mentioned description is to be considered exemplary, rather than limiting, and the true scope of the invention is that defined in the following claims.

What is claimed is:

1. A junction box cover assembly comprising:
   a junction box access port having a first mating surface, an inner member, and at least one keyway formed therein;
   a junction box lid having:
      a first disc having a first outer periphery and a resting surface for engagement with the mating surface,
      a second disc integrally formed with the first disc and having a second outer periphery smaller in diameter than the first outer periphery, and
      at least one extension integrally formed with the second disc and protruding therefrom for insertion through the keyway such that junction box lid non-threadably engages the access port; and
   a ring for securing a section of material against an upper surface of the junction box lid.

2. The junction box cover assembly of claim 1 wherein a stop flange is integrally formed and extends downward from the mating surface to prevent rotation of the junction box lid in one direction.

3. The junction box cover assembly of claim 1 wherein the keyway includes at least one slot disposed in the access port.

4. The junction box cover assembly of claim 1 wherein the keyway includes a retention surface disposed in the access port.

5. The junction box cover assembly of claim 1 wherein the keyway consists of a ramp formed on the inner member, a retention surface disposed in the access port, and at least one slot disposed in the access port.

6. The junction box cover assembly of claim 1 wherein a tang is integrally formed with the inner member, and extends downward therefrom, to prevent further rotation of the cover once secured in the access port.

7. The junction box cover assembly of claim 3 wherein the extension is inserted through the at least one slot of the keyway when the junction box lid is inserted into the access port.

8. The junction box cover assembly of claim 1 further including a plurality of securing means each having a set length, being inserted through the junction box lid and into the ring for securing the ring to the lid prior to the lid being installed in the access port.

9. The junction box cover assembly of claim 8 wherein the plurality of securing means are inaccessible if the junction box lid is installed in the access port.

10. The junction box cover assembly of claim 1 further including means for enabling differing thicknesses of the section of material to be used in the ring.

11. The junction box cover assembly of claim 1 further including a ramp formed on the inner member for gradually tightening the junction box lid into the access port during rotation of the lid.

12. A junction box cover for installing in an access port that is disposed in a junction box adapted to be received at least partially within a floor having a flooring material laid thereon, the junction box cover comprising:
   a ring;
   the access port having an outer member with an inner surface and an upper surface, an inner member with an inside surface, a support surface, and a keyway;
   a junction box lid having:
      a first disc with a contact surface and a resting surface, the contact surface abutting the inner surface of the outer member and the resting surface supported by the support surface of the inner member when the cover is installed in the access port,
      a second disc integrally formed with the first disc and having an outer surface that abuts the inside surface of the inner annular member when the cover is installed in the access port, and
      at least one extension integrally formed with the second disc and protruding therefrom for insertion through the keyway such that the cover non-threadably engages the access port;
   a plurality of securing means each having a set length, for inserting through the lid and into the ring for securing the ring to the lid prior to the cover being installed in the access port, the plurality of securing means being unaccessible if the cover is installed in the access port; and
   a section of the flooring material disposed between the ring and the junction box lid.

13. The junction box cover of claim 12 wherein a stop flange is integrally formed with the inner member, and extends downward therefrom, to prevent rotation in one direction of the cover once the at least one extension is inserted through the keyway.

14. The junction box cover of claim 12 wherein the keyway includes at least one slot disposed in the access port.

15. The junction box cover of claim 12 wherein the keyway includes a retention surface disposed in the access port.

16. The junction box cover of claim 12 wherein the keyway consists of a ramp formed on the inner member, and a retention surface and at least one slot disposed in the access port.

17. The junction box cover of claim 12 wherein a tang is integrally formed with the inner member, and extends downward therefrom, to prevent further rotation of the cover once secured in the access port.

18. The junction box cover of claim 15 wherein the extension further includes an engagement surface such that when the extension is inserted through the keyway and the cover is rotated, the engagement surface will contact the retention surface.

19. The junction box cover of claim 12 further including means for enabling differing thicknesses of the section of flooring material to be used in the cover.

20. The junction box cover of claim 12 further including a ramp formed on the inner member for gradually tightening the cover into the access port during rotation of the cover.

21. A junction box cover for an access port that is disposed in a junction box adapted to be received at least partially within a floor having a flooring material laid thereon, the junction box cover comprising:

a ring having a lower surface and a plurality of threaded bosses extending downward therefrom;

the access port having an outer annular member with an inner surface and an upper surface, an inner annular member having an inside surface, a stop flange and a tang formed from the inner annular member and extending downward therefrom, the stop flange preventing counterclockwise rotation of the cover once inserted into the access port and the tang preventing further clockwise rotation of the cover once secured in the access port, a support surface, a retention surface, and at least one slot disposed in the inner annular member;

a substantially solid and annular junction box lid having:
a first disc with a contact surface, a resting surface, and a plurality of bores extending therethrough, the contact surface abutting the inner surface of the outer annular member and the resting surface being supported by the upper surface of the inner annular member when the cover is installed in the access port, a plurality of recesses disposed in the first disc for each receiving, at least partially, one of the threaded bosses therein and each in axial alignment with one of the plurality of bores, a second disc integrally formed with the first disc and having an outer surface that abuts the inside surface of the inner annular member when the cover is installed in the access port, and at least one extension integrally formed with the second disc and protruding therefrom for insertion through the at least one slot when the cover is installed in the access port, the extension including an engagement surface such that when the extension is inserted through the at least one slot and the cover is rotated, the engagement surface will contact the retention surface and the extension abuts the tang such that the cover non-threadably engages the access port and is releasably secured therein;

a substantially annular section of the flooring material disposed between the ring and the junction box lid, having a given thickness, and being in contact with the lower surface of the ring, the section of the flooring material having a plurality of notches cut therefrom, each receiving one of the threaded bosses therethrough, the section of the flooring material being partially exposed through the junction box cover;

a plurality of securing means each having a set length and being inserted through one of the plurality of bores and corresponding recesses to screwingly engage one of the corresponding plurality of threaded bosses prior to the cover being installed in the access port, and the plurality of securing means being unaccessible when the cover is installed in the access port; and wherein increasing and decreasing the set length of the plurality of securing means allows for differing thicknesses of the section of flooring material.

* * * * *